United States Patent
Zanzucchi et al.

(10) Patent No.: US 7,255,647 B2
(45) Date of Patent: Aug. 14, 2007

(54) METHOD AND SYSTEM FOR DETERMINING CLUB HEAD SPEED

(75) Inventors: Peter John Zanzucchi, Princeton Junction, NJ (US); Jonathan Bernstein, New York, NY (US)

(73) Assignee: Blue Marlin, New York, NY (US)

( * ) Notice: Subject to any disclaimer, the term of this patent is extended or adjusted under 35 U.S.C. 154(b) by 0 days.

(21) Appl. No.: 11/357,215

(22) Filed: Feb. 21, 2006

(65) Prior Publication Data

US 2006/0189398 A1    Aug. 24, 2006

Related U.S. Application Data

(60) Provisional application No. 60/654,000, filed on Feb. 18, 2005.

(51) Int. Cl.
*A63B 69/36* (2006.01)
(52) U.S. Cl. .................. 473/156; 473/219; 473/223
(58) Field of Classification Search .......... 473/219, 473/220, 221, 222, 151–153, 155, 156, 199; 434/252; 356/394; 273/108.2
See application file for complete search history.

(56) References Cited

U.S. PATENT DOCUMENTS

| | | | |
|---|---|---|---|
| 5,342,054 A * | 8/1994 | Chang et al. | 473/156 |
| 5,626,526 A * | 5/1997 | Pao et al. | 473/156 |
| 5,846,139 A * | 12/1998 | Bair et al. | 473/156 |
| 5,860,648 A * | 1/1999 | Petermeier et al. | 273/108.2 |
| 6,302,802 B1 * | 10/2001 | Pao | 473/156 |

\* cited by examiner

*Primary Examiner*—Nini F. Legesse
(74) *Attorney, Agent, or Firm*—Bingham McCutchen LLP

(57) ABSTRACT

A one dimensional (1D) line imaging system that operates at a scanning (clock) rate of between 10-40 MHz is used to monitor the characteristics of a golf swing. A line image is analyzed in real time by an associate computer imaging system removing the need for a trigger to operate. Optics of the imaging system are designed to relate ball image size to distance so that the number of 1 D pixels imaging the ball, in particular sensing a white object, have a relation to distance to the ball. Ball image size is related to distance by monitoring the rate of increase (rate of change) of the pixels imaging the ball with time so that the speed of the club head can be determined. The speed of a golf ball that has been struck is determined by monitoring the rate of decrease (rate of change) of the pixels imaging the ball.

2 Claims, 5 Drawing Sheets

A

B

C

METHOD AND SYSTEM FOR DETERMINING CLUB HEAD SPEED

CROSS REFERENCE TO RELATED APPLICATIONS

The present invention claims priority to provisional Patent Application No. 60/654,000 filed Feb. 18, 2005, the entirety of which is incorporated herein by reference.

BACKGROUND OF THE INVENTION

1. Field of the Invention

The present invention relates to a method, a system and a computer program product for determining club head speed. More particularly, the present invention relates to a method, a device and a computer program product for determining the characteristics of a swing including club head speed and golf ball speed.

2. Description of the Prior Art

The distance a golf ball will travel depends on the velocity of the golf ball after it is struck. The golf ball velocity in turn depends on the velocity of the club head of a golf club striking the golf ball or momentum transfer, where momentum is defined as mass times velocity. Thus, both the mass of the club and its velocity or speed is important to golfers in a variety of circumstances. Knowing club head speed and golf ball speed are important to golfers because it helps in the selection of golf clubs as well as tracks a golfer's improvement. The need to monitor the golfer's stroke, in particular club head speed, and the alignment of drives has long been recognized.

Techniques have been suggested that use accelerometers to measure club head speed. Other techniques employ sensors and a CCD camera that can be triggered to measure the motion and velocity of a game ball as well as the swing speed of the club head striking the golf ball. Another technique monitors the three coordinates of a golfer's swing in three dimensions (3D). These technologies use video, CCD or CMOS two dimensional (2D) imagers that operate with MHz cycles (clock rate) or very fast shutter speeds to sense these short time frame events. Golf clubs have been modified to include electronic sensors that provide information on at least club head speed. However, the existing techniques to measure club head speed are limited by the need to set up relatively complex optical or electronic devices, the need for alignments of devices, or the need to modify quality golf clubs changing their balance and affecting a player's performance. In addition, the multiple two dimensional image arrays, for example 2,000×2,000 pixels or 4,000,000 pixels obtained in such measurements, contain excessive amounts of unneeded information that are a burden to analyze and discard in what needs to be light weight portable equipment.

Accordingly, there is a need for a method of determining club head speed. There is a need for the method to determine club head and golf ball speed in real time. There is a need for the method to determine club head and golf ball speed while playing the game of golf or practicing at a range. There is a need for the method to be implemented using a hand-held device. There is a need for the method implement by a device that can be attached to, or integrated onto, a golf club for the purpose of monitoring club head and ball speed. Alternately, the system described may be used separately without significant alignment.

SUMMARY OF THE INVENTION

According to embodiments of the present invention, a method, a device and a computer program product for determining club head and golf ball speed are provided. The time frame at which the club head reaches maximum velocity prior to striking a golf ball is between 0.03-0.003 seconds. In order to monitor club head speed, the present invention operates at speeds between a microsecond and a millisecond. In addition, the present invention uses a one dimensional (1D) line imaging system that operates at a scanning (clock) rate of between 10-40 MHz. A line image is analyzed in real time by an associate computer imaging system removing the need for a trigger to operate. Optics of the imaging system are designed to relate ball image size to distance so that the number of 1 D pixels imaging the ball, in particular sensing a white object, have a relation to distance to the ball. In an embodiment of the present invention, ball image size is related to distance by monitoring the rate of increase (rate of change) of the pixels imaging the ball with time so that the speed of the club head can be determined. In an embodiment of the present invention, the imaging system determines the speed golf ball that has been struck by monitoring the rate of decrease (rate of change) of the pixels imaging the ball.

In an embodiment of the present invention, the trajectory and direction of the golf ball can be determined employing a modified line scanning imager with one or more independent lines, such as right, center and left line scanning imagers. The signals to these imagers can be analyzed to determine the direction of the golf ball. By use of two line scan imagers one separate and one attached or integrated to the club head of a golf club, the golf ball trajectory may be determined. In an embodiment of the present invention, a more detailed analysis of the golf swing can be made using a two dimensional imager where both trajectory and direction may be determined. In an embodiment of the present invention, the imaging system is attached or integrated on the shaft just above the club head. The information obtained by the imaging system can be transmitted to a hand-held device for analysis and display of the results. In an embodiment of the present invention, the imaging system can be used separately from the golf club without significant alignment. The imaging system is intended to be portable and light weight such that it is readily usable during a game of golf or on a practice range.

BRIEF DESCRIPTION OF THE DRAWINGS

The above described features and advantages of the present invention will be more fully appreciated with reference to the detailed description and appended figures in which.

DETAILED DESCRIPTION OF THE INVENTION

The present invention is now described more fully hereinafter with reference to the accompanying drawings that show embodiments of the present invention. The present invention, however, may be embodied in many different forms and should not be construed as limited to embodiments set forth herein. Appropriately, these embodiments are provided so that this disclosure will be thorough and complete, and will fully convey the scope of the present invention.

The time frame at which the club head reaches maximum velocity prior to striking a golf ball is between 0.03-0.003 seconds. In order to monitor club head speed, the present invention operates at speeds between a microsecond and a millisecond. In addition, the present invention uses a one dimensional (1D) line imaging system that operates at a scanning (clock) rate of between 10-40 MHz. A line image is analyzed in real time by an associate computer imaging system removing the need for a trigger to operate. Optics of the imaging system are designed to relate ball image size to distance so that the number of 1 D pixels imaging the ball, in particular sensing a white object, have a relation to distance to the ball. In an embodiment of the present invention, ball image size is related to distance by monitoring the rate of increase (rate of change) of the pixels imaging the ball with time so that the speed of the club head can be determined. In an embodiment of the present invention, the imaging system determines the speed golf ball that has been struck by monitoring the rate of decrease (rate of change) of the pixels imaging the ball.

In an embodiment of the present invention, the trajectory and direction of the golf ball can be determined employing a modified line scanning imager with one or more independent lines, such as right, center and left line scanning imagers. The signals to these imagers can be analyzed to determine the direction of the golf ball. By use of two line scan imagers one separate and one attached or integrated to the club head of a golf club, the golf ball trajectory may be determined. In an embodiment of the present invention, a more detailed analysis of the golf swing can be made using a two dimensional imager where both trajectory and direction may be determined. In an embodiment of the present invention, the imaging system is attached or integrated on the shaft just above the club head. In an embodiment of the present invention, the imaging system can be used separately from the golf club without significant alignment.

Figure 1:
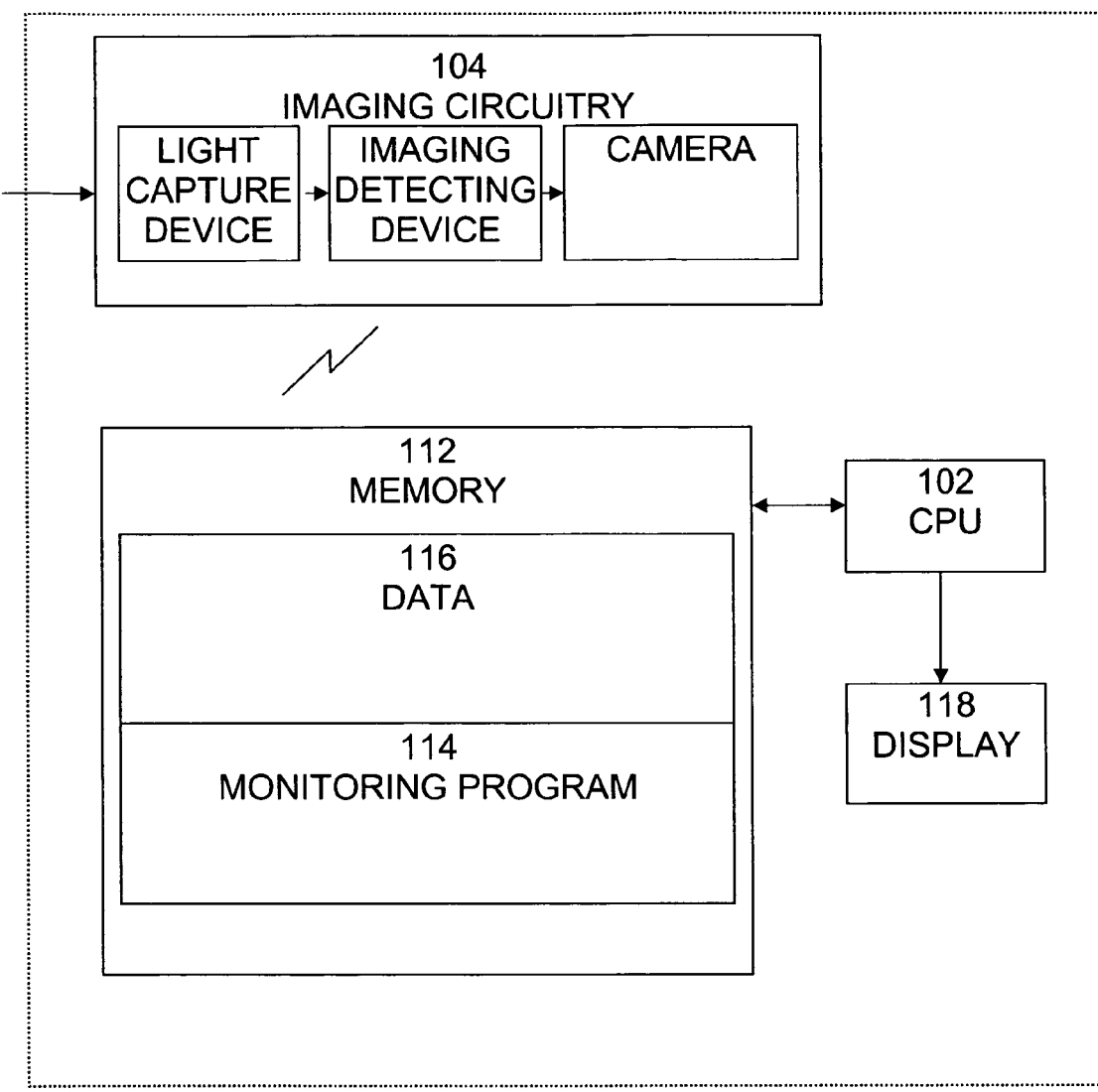
FIG. 1 depicts an exemplary functional block diagram of a device in which the present invention can find application.

FIG. 1 depicts a functional block diagram of system in which the present invention can find application. In the embodiment of FIG. 1, system 100 can be implemented to determine characteristics of a golf swing including, but not limited to, club head and golf ball speeds. In the FIG. 1 embodiment, system 100 is a digital camera like the Scout™, but can be any apparatus that captures images and executes program instruction in accordance with the present invention. In an embodiment of the present invention, components of the system 100 are integrated into a golf club, such as the golf club head, shaft or shank. In an embodiment of the present invention, the system 100 is freestanding and independent of a golf club.

In the FIG. 1 embodiment of the present invention, the system 100 includes a processor (CPU) 102, imaging system 106, memory 108, data 110, and display 112. In the FIG. 1 embodiment, imaging system 106 includes, a light capture device, a light detecting device, and a camera. The imaging system 106 detects the presence of light from an object, such as a golf ball, and upon detecting the presence of light from the object captures images of the object. The imaging system 106 must be sufficiently small and light weight so that its presence on a golf club will not affect the club performance. In an embodiment of the present invention, the imaging system 106 is 1 cm to 2 cm in size. In an embodiment of the present invention, the imaging system is 2 cm to 3 cm in size. In an embodiment of the present invention, the imaging system 106 is integrated into a golf club head of a golf club. In an embodiment of the present invention, the imaging system 106 is integrated into the shank or shaft of a golf club above the club head of the golf club. In an embodiment of the present invention, the imaging system 106 is integrated into system 100. In an embodiment of the present invention, imaging system 106 is a 2048 pixel line scan imager and associated electronics.

In the FIG. 1 embodiment of the present invention, a one dimensional CCD imager is implemented. If a one dimensional CCD imager is implemented a trigger is not needed. In an embodiment employing a 2 dimensional CCD imager a trigger is needed. In an embodiment of the present invention the trigger is a the light capture device that extends from the shaft of the golf club, couples to the light detection device positioned above the golf club head, and captures the presence of light from an object. Light capture devices can include, but are not limited to, fiber optics and "light pipes." The light detecting device detects light captured from light capture device, couples to the camera, and generates a signal for camera to trigger and take images of the object. The light is captured just prior to the face of the golf club head contacting a golf ball. In an embodiment of the present invention, the lens is of short focal length in order to maximize the relation between image size and distance in the club head swing so that the golf ball image nearly fills the length of the line scanning imager at the contact distance.

In the FIG. 1 embodiment of the present invention, the imager system 106 may be at an angle to the golf ball. In an embodiment of the present invention, the angle is less than 20 degrees. In the FIG. 1 embodiment of the present invention, the lens is made of plastic. In an embodiment of the present invention, the lens can be any of, but is not limited to, a conventional concave lens and a cylindrical (barrel) lens. A cylindrical lens enhances the detection of the golf ball image by reducing a two dimensional image into a one dimensional or line image thus concentrating the light from the object. In an embodiment of the present invention, the lens enhances the ambient lighting conditions found on golf courses.

In an embodiment of the present invention, the light detecting devices is a photodiode, but can be any device operable to detect light and provides an interface for acquiring object light. In the FIG. 1 embodiment of the present invention, the white pigments in golf balls, as well as the fluorescent whitening agents, such as Uvitex OB by Ciba Specialty Chemicals, Inc., widely used on golf balls provide for diffuse reflection of light or for blue fluorescence when golf balls are in the presence of sunlight that can be detected by light detecting device. Once light is sensed by the light detection device, an electrical signal is available to cause the camera to trigger.

In the FIG. 1 embodiment of the present invention, the camera receives a signal indicating that the presence of light from the object has been detected, generates images of the object in a digital code suitable for further digital signal processing by CPU 102 and provides the generated images of the object to memory 112. The CPU 102 is a microprocessor, such as an INTEL PENTIUM® or AMD® processor, but can be any processor that executes program instructions in order to carry out the functions of the present invention. In an embodiment of the present invention, the images generated by camera are provided by wirelessly transmitting the generated images using a transceiver.

In the FIG. 1 embodiment, the memory 112 is coupled to CPU 102 and stores monitoring program 114 and data 116.

The data 116 includes, but is not limited to, images depicting the objects, coordinates of golf club head and coordinates of the object's immediate travel.

In the FIG. 1 embodiment, the monitoring program 114 provides the functionality associated with detecting the coordinates of golf club head and the coordinates of the object's immediate travel path as executed by the CPU 102. The monitoring program 114 is designed to report the coordinates of golf club head and the coordinates of the object's immediate travel path on a display 118.

Figure 2A:
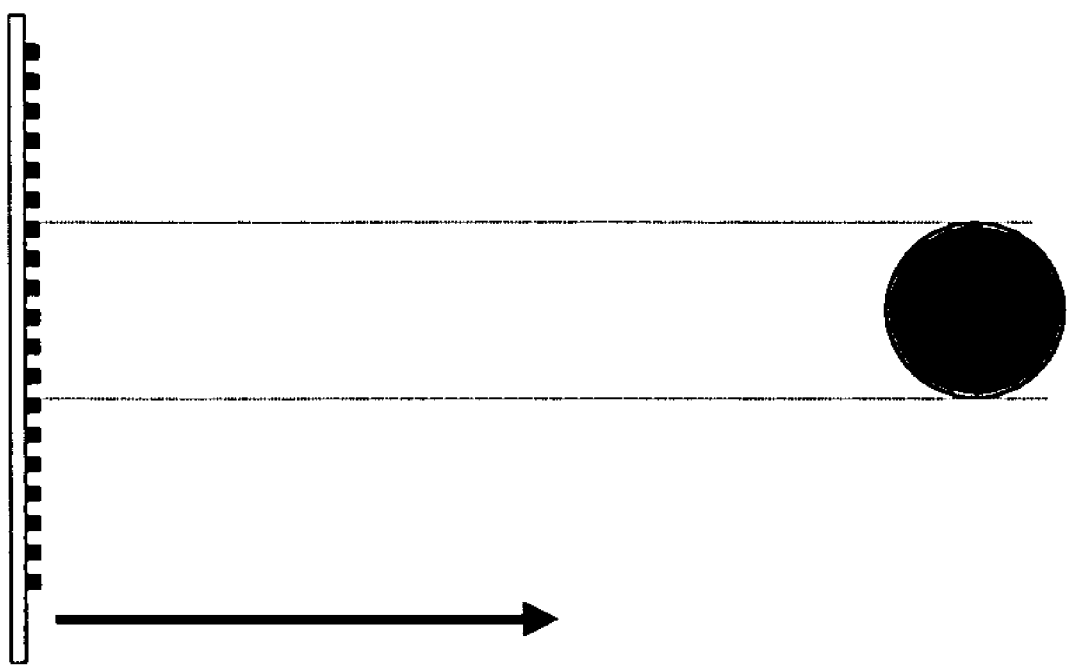
FIGS. 2A-2C depicts exemplary diagrams of a imaging system 106 depicted in FIG. 1 and a detected object at differing distances from the imaging system 106.
Figure 2B:
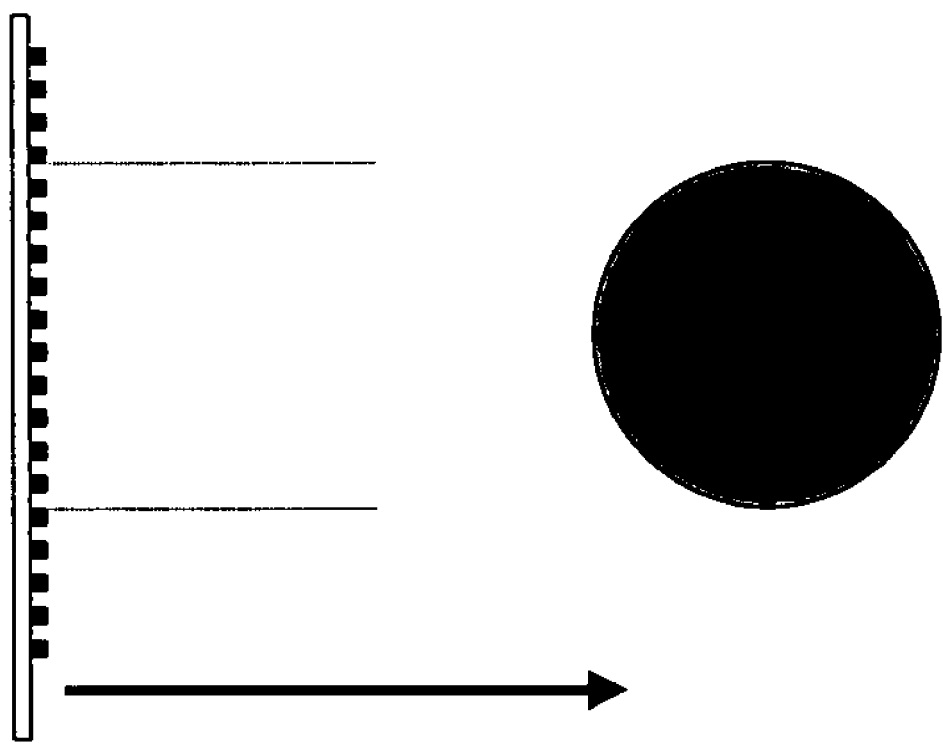
Figure 2C:
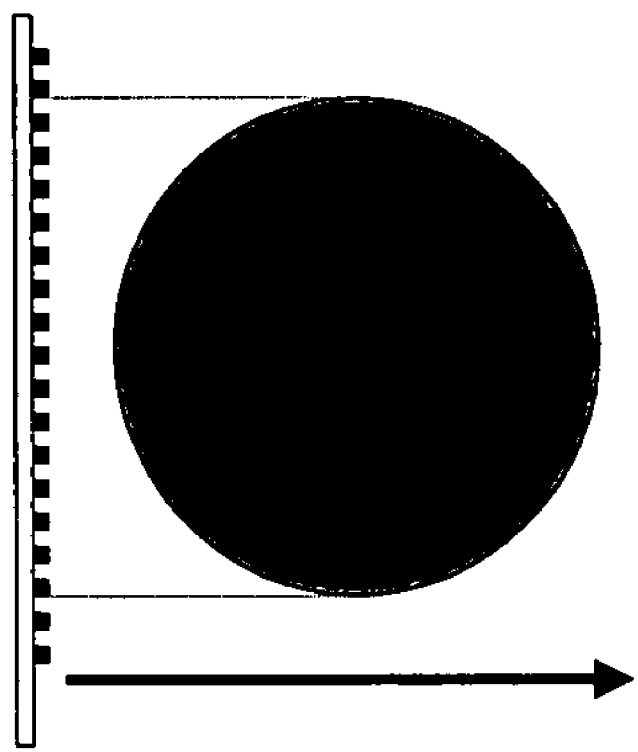

FIGS. 2A-2C depicts exemplary diagrams of a imaging system 106 depicted in FIG. 1 and a detected object at differing distances from the imaging system 106. FIG. 2A depicts the detection of a golf ball early in the bottom of a swing by imaging system 106. the arrow represents the direction of the imaging system as it approaches a golf ball. FIG. 2B depicts the detection of a golf ball as the golf club is approaching the detected golf ball. FIG. 2C depicts the detection of a golf ball just prior to the golf club coming in contact with the golf ball. As seen in FIGS. 2A-2C, as the imaging system gets closer to the golf ball the image of the golf ball increases and the number of pixels needed for the image also increases. In an embodiment of the present invention, the speed of the club head can be determined by monitoring the rate of increase (rate of change) of the pixels imaging the ball with time. In an embodiment of the present invention, the imaging system determines the speed golf ball that has been struck by monitoring the rate of decrease (rate of change) of the pixels imaging the ball.

Figure 3:
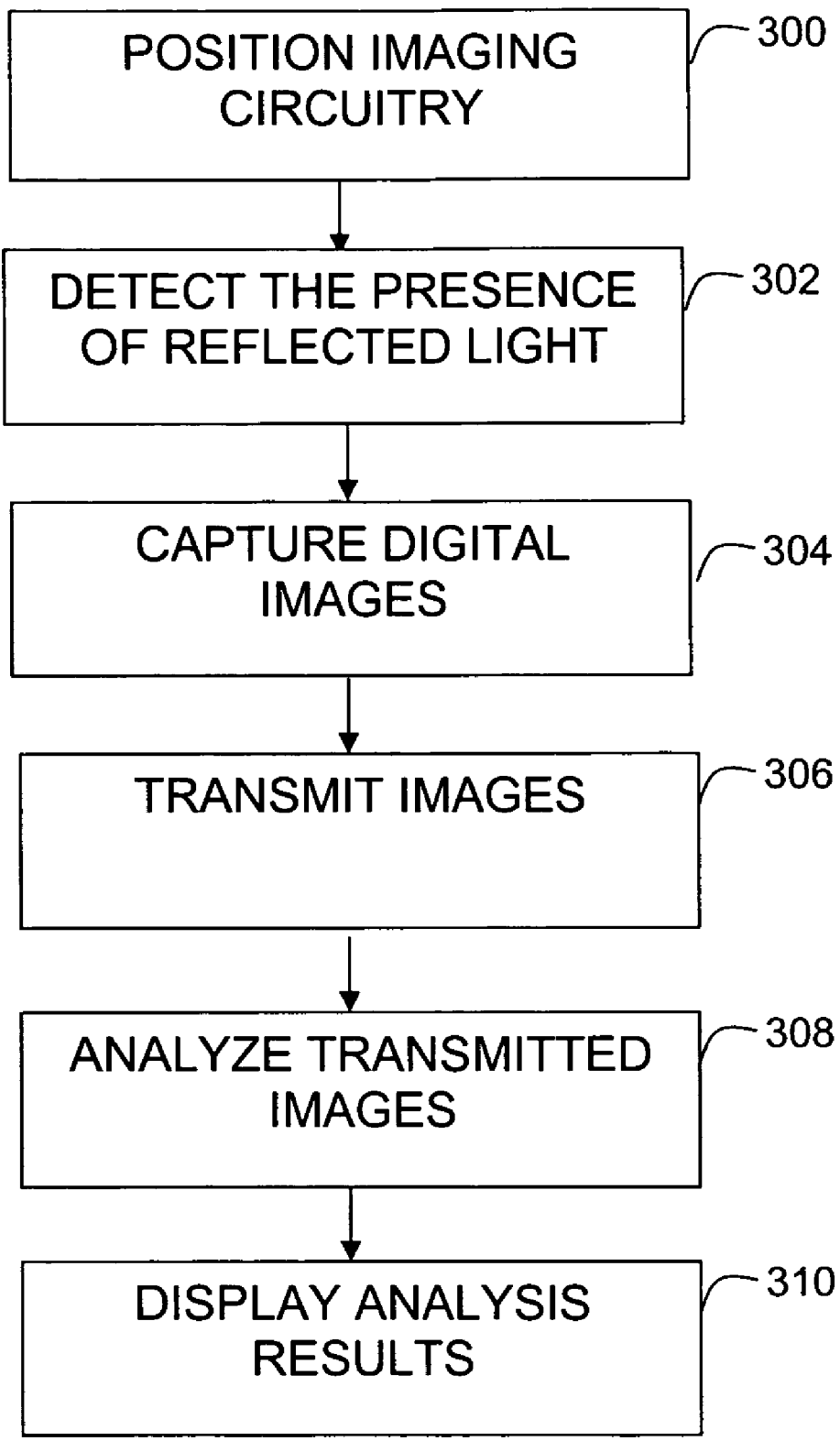

FIG. 3 depicts an exemplary flow diagram for determining golf swings characteristics while playing the game of golf according to an embodiment of the present invention. The method begins at step 300. In step 300, imaging circuitry is positioned. In an embodiment of the present invention, the imaging circuitry is integrated into the shaft of a golf club. In an embodiment of the present invention, the imaging circuitry is positioned just above the club head of the golf club. In an embodiment of the present invention, imaging circuitry is place in a freestanding position proximate to the golf ball. In step 302, the light detection device of the imaging circuitry detects the presence of light reflected of a golf ball being putt. In step 304, a camera, such as a line image camera or 2 dimensional CCD camera of imaging circuitry captures successive images of the golf ball as it approaches the golf ball. In step 306, the successive images are transmitted to a memory. In step 308, the successive images are analyzed by a processor using a computer program as described herein to determine various characteristics of the swing. In an embodiment of the present invention, the speed of the club head can be determined by monitoring the rate of increase (rate of change) of the pixels imaging the ball with time. In an embodiment of the present invention, the imaging system determines the speed golf ball that has been struck by monitoring the rate of decrease (rate of change) of the pixels imaging the ball. In step 310, the results of the analysis are displayed.

While specific embodiments of the present invention have been illustrated and described, it will be understood by those having ordinary skill in the art that changes can be made to those embodiments without departing from the spirit and scope of the invention. For example, while the present invention concentrates on a single, it is understood that information from a series of images, a moving object or a specific object might advantageously be used as well. Also, while our application to golf balls has us discussing UV and visible light, the method is not dependent on this choice.

What we claim is:

1. A method of determining golf swing characteristics comprising
    positioning imaging circuitry;
    detecting the presence of light reflected from a golf ball as a golf club is swung;
    obtaining successive images of the golf ball once the presence of the reflected light from the golf ball; and
    analyzing the successive images to determine at least one characteristic of the swing, wherein the imaging circuitry is positioned in the shaft of the golf club.

2. The method according to claim 1, wherein the at least one characteristic is any one of: the speed of the golf ball or the speed of the golf club.

* * * * *